(12) United States Patent
Würsch et al.

(10) Patent No.: US 6,587,184 B2
(45) Date of Patent: Jul. 1, 2003

(54) POSITIONING AID FOR A HAND TOOL DEVICE

(75) Inventors: Christoph Würsch, Werdenberg (CH); Roland Schaer, Grabs (CH); Klaus Dass, Sax (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/115,170

(22) Filed: Apr. 3, 2002

(65) Prior Publication Data

US 2002/0145724 A1 Oct. 10, 2002

(30) Foreign Application Priority Data

Apr. 10, 2001 (DE) .......................... 101 17 953

(51) Int. Cl.[7] .................. G01C 3/08; G01C 1/00; G01B 11/26; B23B 39/06; B23B 49/00; B23G 1/00; B26B 11/00
(52) U.S. Cl. .................. 356/4.01; 356/139.03; 408/13; 408/16; 408/241 G; 7/163
(58) Field of Search ............... 356/4.01, 5.15, 356/7, 9, 11, 20, 21, 139.03, 139.04, 400; 33/274; 408/13, 15, 16, 241 G; 7/163, 164

(56) References Cited

U.S. PATENT DOCUMENTS 4,683,493 A * 7/1987 Taft et al. .................. 348/90
4,893,025 A * 1/1990 Lee ..................... 250/559.33
4,984,371 A * 1/1991 Fredrickson .............. 33/263
5,062,747 A   11/1991 Chen
5,484,026 A * 1/1996 Susaki et al. ............... 173/4
5,675,899 A * 10/1997 Webb ...................... 30/390
6,375,395 B1 * 4/2002 Heintzeman ............... 408/16

FOREIGN PATENT DOCUMENTS

| DE | 2838968 |    | 3/1980  |           |
|----|---------|----|---------|-----------|
| DE | 2838968 | A1 * | 3/1980 | ......... B23B/45/00 |
| DE | 3615875 |    | 11/1987 |           |
| DE | 3912991 | A1 * | 10/1990 | ........ B23B/45/02 |
| DE | 4218982 |    | 7/1993  |           |
| DE | 4336730 |    | 5/1995  |           |
| DE | 29615933 |   | 12/1996 |           |
| DE | 19836812 | A1 * | 2/2000 | ......... G01C/03/00 |
| DE | 19531484 |   | 10/2000 |           |
| DE | 10013943 |   | 3/2001  |           |
| DE | 19943818 |   | 3/2001  |           |

* cited by examiner

Primary Examiner—Thomas H. Tarcza
Assistant Examiner—Brian Andrea
(74) Attorney, Agent, or Firm—Sildey Austin Brown & Wood, LLP

(57) ABSTRACT

A positioning aid (1) for a hand tool device (3) driving tool (2), in a working direction (A), with a distance measuring system (4) mounted thereon. The distance measuring system (4) has at least one distance measuring sensor (5) for measuring the distance from the distance measuring sensor (5) to an object (6), along a line of measurement (M, M', M"), and a computing unit (7) for comparing the measured value with a pre-selected desired value (S) and for producing a signal dependent on the comparison, wherein the line of measurement (M, M') is oriented at least partially perpendicular to the working direction (A).

15 Claims, 4 Drawing Sheets

POSITIONING AID FOR A HAND TOOL DEVICE

BACKGROUND OF THE INVENTION

The invention relates to a positioning aid for definite placement, of a forward-advanced tool of a hand tool device, such as a drill hammer, a bolt setting device or a chain saw, longitudinal to the line of travel of the tool.

In routine tasks, in particular, in the construction industry, the set-down point of a tool, in a sequence of work operations, frequently has, in the line of travel of the tool, an absolute or incrementally set lateral distance to a reference point, such as, for example, a wall, edge, ceiling, floor or any other structural part running parallel to the line of travel of the tool. In such cases either each of these set-down points is marked by the user in a preparatory work step, or a temporary measuring aid, such as a straightedge, is used by the operator between each work step.

According to U.S. Pat. No. 4,984,371, a passive optical positioning aid constructed as a mirror sight acts, on a chain saw, as the hand tool device, in conjunction with the operator's line of sight, as an integrated positioning aid for placement of the hand tool device at a set lateral distance relative to the edge.

According to DE 2838968, a hammer drill has an electronic depth stop that uses an ultrasound echo process, a high-frequency radar, or an optical laser, in a triangulation technology, as the distance measuring system parallel to the line of travel of the tool.

According to U.S. Pat. No. 4,683,493, a milling machine has a laterally radiating, optically expanded laser functioning as a light source for a passive, image producing process.

Further, according to U.S. Pat. No. 4,893,025, a sensor system of a robot hand has a plurality of optical distance measuring systems for determining a position.

According to DE 19836812, a hand laser measuring device with a modulated optical laser, as the distance measuring system, comprises a plurality of different angularly oriented individual measurements using an arithmetic algorithm to determine the shortest distance to a surface.

The object of the present invention is to provide a positioning aid integrated with the hand tool device for laterally predetermined set-down points of the tool.

SUMMARY OF THE INVENTION

The object is achieved essentially by the present invention. In accordance with the invention, a positioning aid mountable on a hand tool device driving a tool, in a line of travel, on the work piece, comprises at least one non-contacting distance measuring system with a distance measuring sensor for measuring the distance from the distance measuring sensor to an at least diffusely reflecting object along a line of measurement and a computing component for comparing the measured value with a preset desired value and for producing a signal dependent on said comparison, whereby the line of measurement is oriented perpendicular to the line of travel on the work piece.

As a result of the perpendicularity of the line of measurement of the distance measurement to the line of travel on a work piece, as in conventional contactless processes, the line of measurement is consistently placed within the plane running perpendicular to the line of travel on the work piece, and, thus, to the surface of the work piece, independent of the advance of the hand tool device. Usually, a lateral desired value is programmed as the desired distance within the plane. The desired value is entered using the conventional data entry means such as keys, and the signaling is provided by the usual output means such as beepers, light emitting diode or numerical displays. The line of measurement can be selected or preset within the plane, by turning the hand tool device with the non-rotationally mounted positioning aid or the rotationally displaceable positioning aid relative to the hand tool device about the line of travel on the work piece.

Preferably, the positioning aid is designed to be combined with the hand tool device, and preferably, with a standardized supplemental hand grip or connected to the suction head of a dust extractor, whereby the positioning aid can be easily and rapidly mounted or removed from the hand tool device, if required.

Preferably, the distance measuring sensor or a deflection means deflecting the measurement signal into the lateral line of measurement, such as a suitable mirror, is arranged along the line of travel on the work piece in close proximity to the tool tip, whereby at the time of set-down of the hand tool device, an angular error of the line of travel on the work piece toward the perpendicular of the work piece surface generates only a minimized lateral error of the measured value.

Preferably, the distance measuring sensor and/or the deflection means is spring-loadedly mounted and can be displaced axially, contacting the work piece surface at the time of set-down of the hand tool device and thus, being located as close as possible to the work piece to not impair the advancement of the tool.

Preferably, the distance measuring sensor and/or the deflection means is freely rotational with respect to the line of travel on the work piece, and accordingly its weight is asymmetrically distributed, such that in a working direction deviating from the gravitational direction, i.e., the horizontal direction, a passive automatic preferred orientation of the line of measurement is produced. In a further advantageous active preferred orientation of the line of measurement, the gravitational line can be picked up, preferably, by acceleration sensors in the electrical control of pivotable deflection means via a computer unit.

Alternatively, preferably, the distance measuring sensor and/or the deflection means can be pivotally-locked at an angle of 90°, at least in one dimension, such that the line of measurement can be selected either perpendicularly within the plane relative to the working direction or parallel to the working direction, wherein in the parallel case the positioning aid serves as a depth stop.

Alternatively, preferably, the distance measuring sensor and/or the deflection means has an electromagnetic or micro-mechanical deflection means with respect to the line of measurement, at least in one dimension, oscillating in a scan range, and the computing unit has an arithmetic algorithm for determining an end distance within the oscillation period, whereby, within the scanning range, the line of measurement automatically given is either perpendicular to a surface or to an adjacent edge, of a structural part, or to one most distant corner. In a laser beam, the deflection means is, preferably, a rotating mirror, prism, fiber optic or laser diode.

Preferably, at least the distance measuring sensor and/or the deflection means are doubly or triply present and oriented at 90° to each other relative to the line of measurement, whereby, simultaneously, two or three independent lines of measurement, for example, lateral positioning and depth, are detectable.

Preferably, the positioning aid comprises main-independent generators or induction coils permeated by the magnetic alternating field, of the hand tool device, as the power source, whereby the power supply cable can be eliminated.

Preferably, the current measured value is transferable, as the desired value, into a storage means, of the positioning aid, using one single transfer key, whereby a very simple and reliable input can be made, even in the rough environment of the construction industry.

Preferably, the signaling is connected with a control means of the hand tool device that, preferably, switchably, permits the appropriate activation, of the hand tool device, only if the measured value lies, in a preferably pre-selectable tolerance range of, for example, ±1 cm of the desired value, whereby, for example, in bolt setting devices, compliance with a minimum distance between set bolts is achievable.

Preferably, the distance measuring sensor is an optically active sensor with an optically visible laser beam, which is driven modulated as a phase, of a pulse period meter or unmodulated in a triangulation process, whereby the lateral line of measurement is directly visible for the operator.

BRIEF DESCRIPTION OF THE DRAWINGS

The invention is more completely described below with reference to a preferred exemplary embodiment read together with.

DETAILED DESCRIPTION OF THE INVENTION

Figure 1:
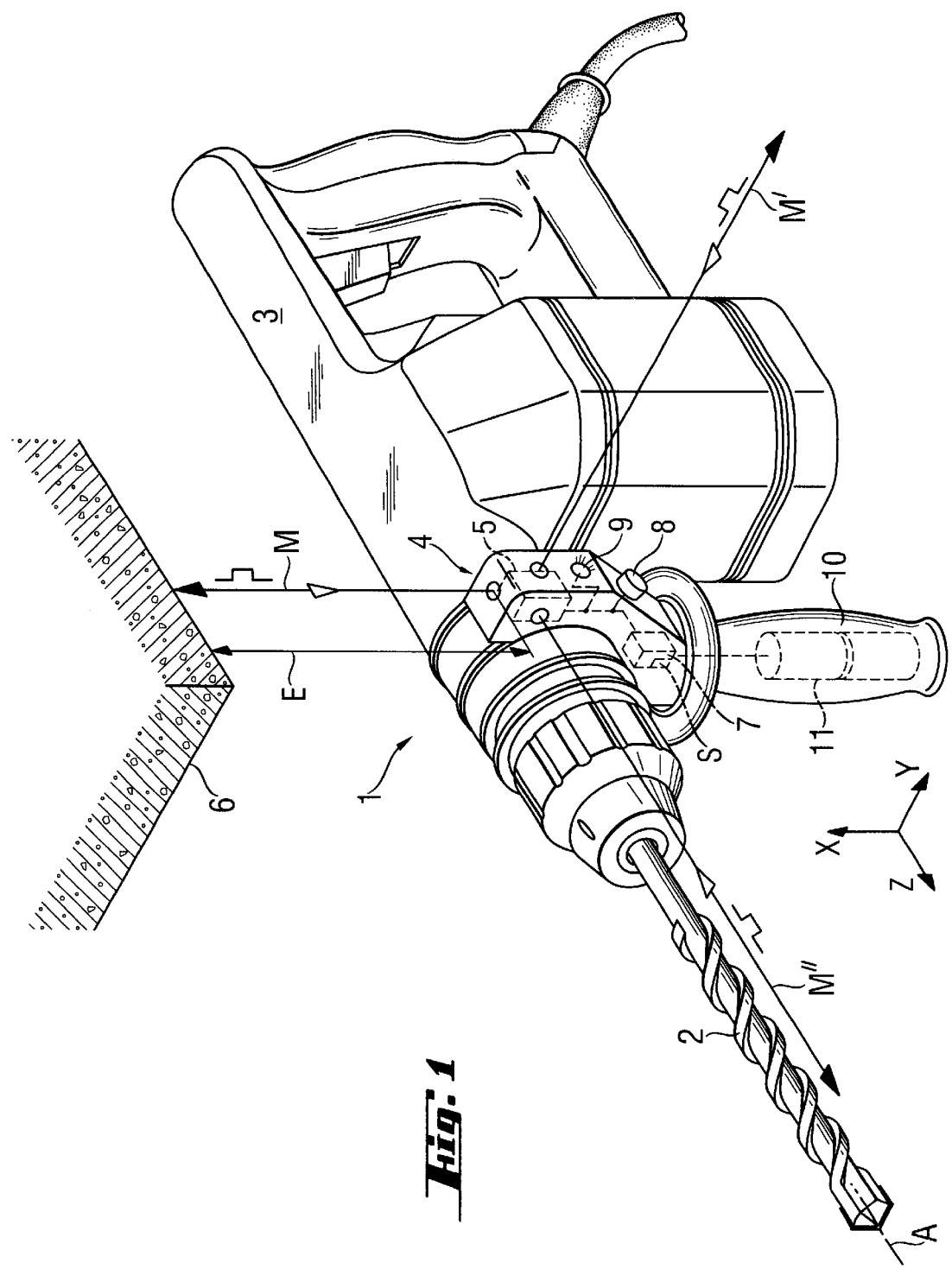
FIG. 1 illustrating a positioning aid for a hand tool device, in accordance with the invention.

According to FIG. 1 a positioning aid 1, which is mounted on a hand tool device 3, advancing a tool 2 in a working direction A, has a pulse period based laser optical distance measuring system 4. The measuring system 4 comprises a distance measuring sensor 5 having three laser diodes for measuring the distance E from the distance measuring sensor 5 to a reflecting object 6, along three lines of measurement M, M', M", each perpendicular to each other, in the form of a tripod, oriented to the X, Y, Z axes of symmetry of the hand tool device 3 and a computing unit 7 with a stored desired value S. The computing unit 7 is connected, in a signal transferring manner, with the distance measuring sensor 5, with a single transfer key as the input means 8, and with a light emitting diode as the output means 9. With a line of measurement M' oriented parallel to the working direction A, the distance measuring system 4 is an electronic depth stop. The positioning aid 1 is connected to an auxiliary handle 10 and may be combined, in a standardized modular manner, with the hand tool device 1. An accumulator 11 is arranged in the auxiliary handle 10, which is connected to the computing unit 7.

Figure 2:
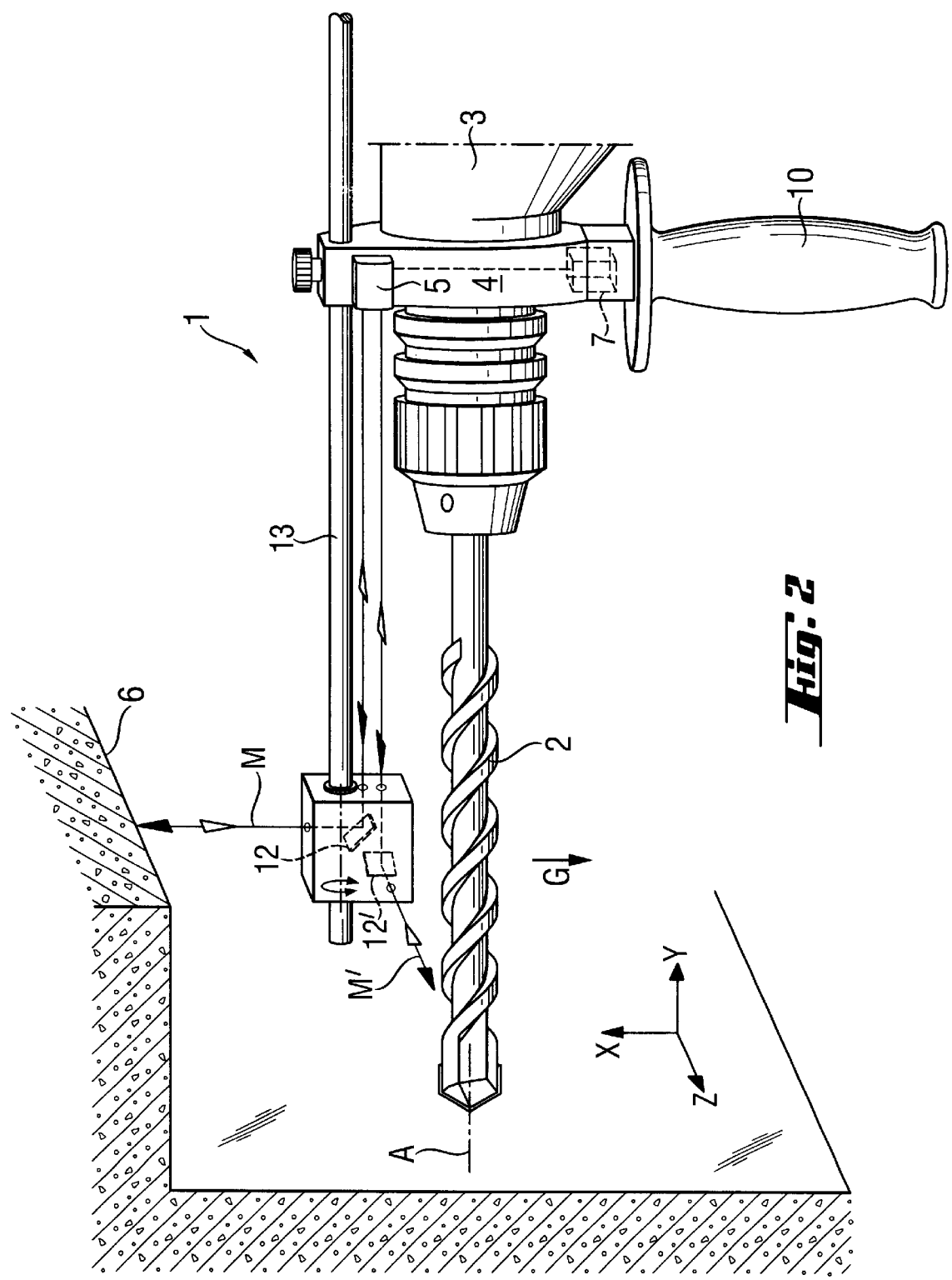
FIG. 2 illustrating a positioning aid, as part of the hand grip, for a drill hammer, in accordance with the invention.

According to FIG. 2, two inclined mirrors are connected to each other and offset from each other by an angle of 90°, as deflection means 12, 12' for the visible laser beam. The deflection means 12, 12', are arranged rotationally on a mechanically mounted depth stop rod 13, parallel to the working direction A, in proximity to the tip of the tool 2, as a positioning aid 1 for a hand tool device 3 with an auxiliary handle 10 and a laser optical distance measuring system 4. The optical distance measuring system 4 having a distance measuring sensor 5 and a computing unit 7 connected to the sensor 5, whereby, via the non-symmetrically distributed weight of the deflection means 12, 12' the lines of measurement M, M' are automatically oriented vertically upwards toward the ceiling, as the object 6, by gravity G and, in the fashion of a tripod, vertically to the ceiling and towards the working direction A.

Figure 3:
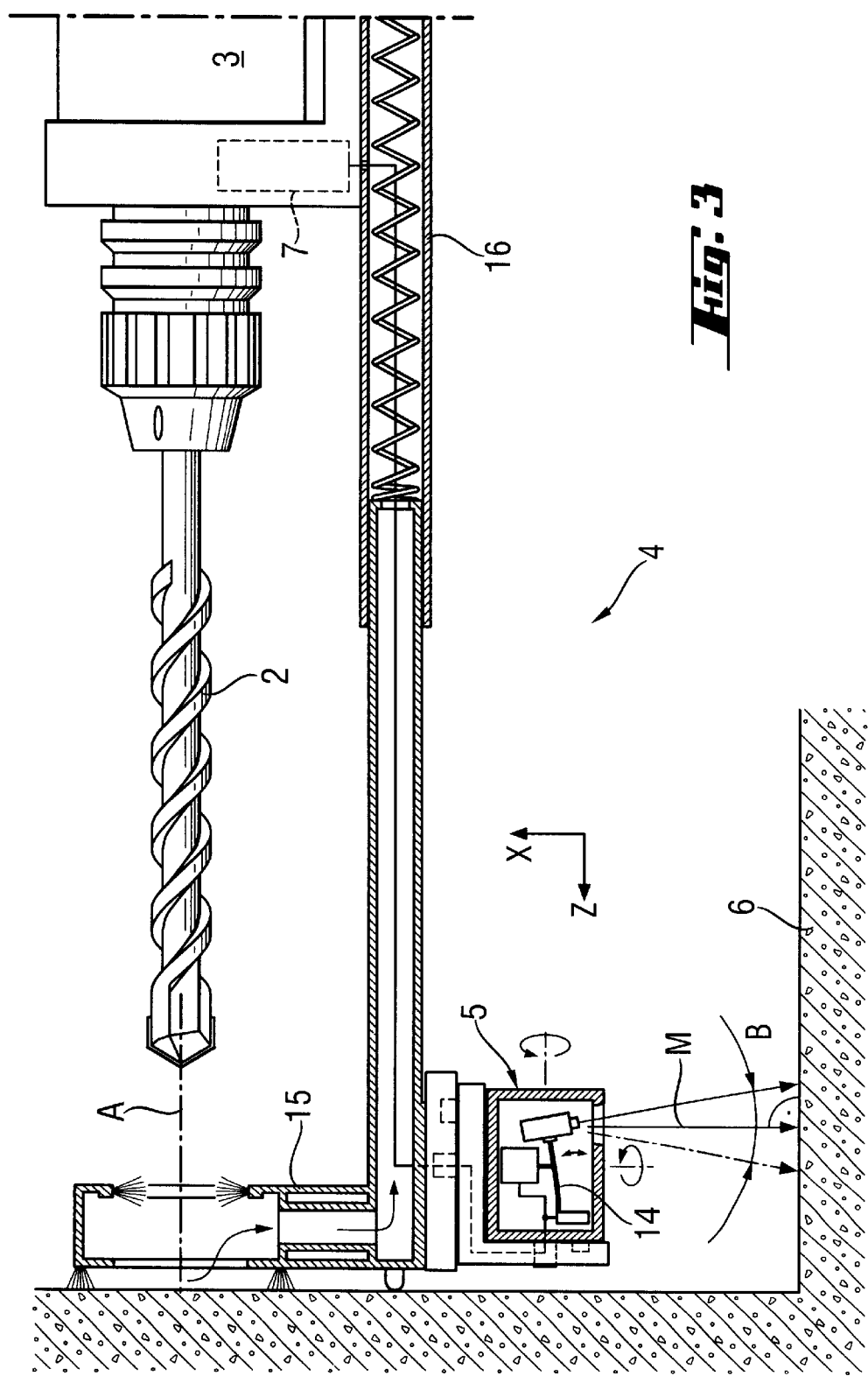
FIG. 3 illustrating a positioning aid, as part of the dust extractor, for a drill hammer, in accordance with the invention.

According to FIG. 3, a distance measuring sensor 5, of the distance measuring system 4, comprises a laser diode, scanning a scanning range B, in an oscillating manner, with an electromechanical cantilevered arm, as the deflection means 14. The distance measuring sensor 5 is connected to a suction head 15, adjacent to the work piece surface, of an axially resilient, spring-loaded moveable dust extractor 16 of a hand tool device 3. The distance measuring sensor 5 is pivotally-lockable in two planes each by an angle of 90°, whereby, within the selected scanning range B, the line of measurement M perpendicular to a lateral surface of the object 6, by which the smallest measurement value is determined, which is calculated by the computing unit 7.

Figure 4:
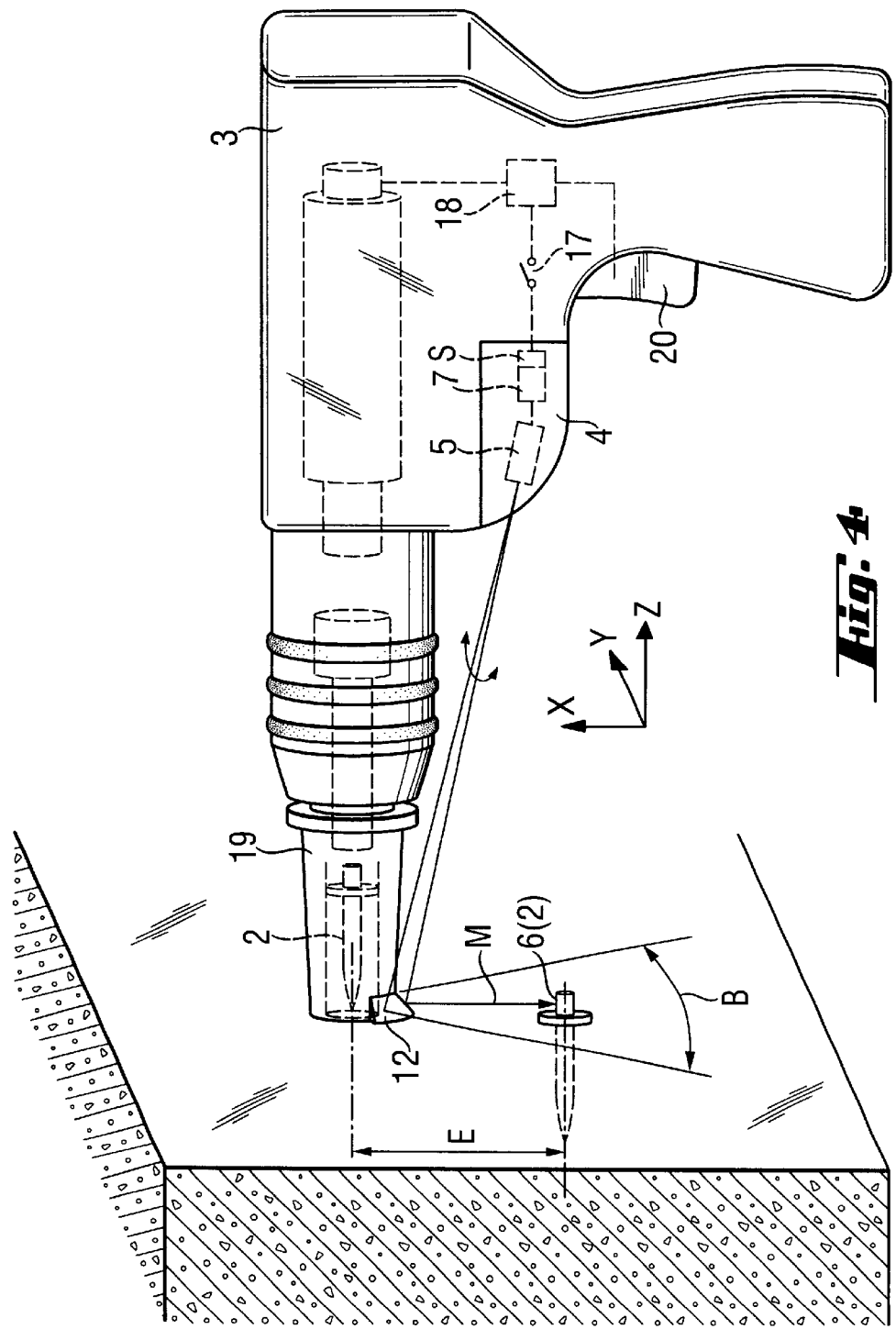
FIG. 4 illustrating a positioning aid for a bolt or stud setting device, in accordance with the invention.

According to FIG. 4, a stud setting device, as the hand tool device 3, for a stud to be set as a lost tool 2, has a laser optical distance measurement system 4 with a computing unit 7, whose signaling is controllable by a control means 18 of the hand tool device 3. The rotationally oscillating, angularly expanded, infrared laser beam displaced over a scanning range B, impinges upon a frusto-conical mirror surface located on a stud guide 19, as a deflecting means 12, and scans the entire half-space lateral to the working direction A. The minimal measured value, of the line of measurement M, detectable by the computing unit 7, is the distance E assigned to an adjacent already set stud, as the object 6. A minimal distance of the stud is defined, by the selected value S stored, in the computing unit 7 and under which activation of the hand tool device 3 is blocked, by a trigger switch 20, via the control means 18.

What is claimed is:

1. A positioning aid for a hand tool device (3) driving a tool (2) in a working direction (A) comprising a non-contacting distance measuring system (4) mounted thereon with at least one distance measuring sensor (5) for measuring a distance to an object (6) along a line of measurement (M, M', M") and a computing unit (7) for comparing a measured value (S) and for producing a signaling dependent on the comparison, wherein the line of measurement (M, M') is at least partially oriented perpendicular to the working direction (A).

2. The positioning aid of claim 1, being combined modularly to the hand tool device (3) and being connectable to an auxiliary handle (10).

3. The positioning aid of claim 1, wherein the tool has a tip and at least one distance measuring sensor (5) is arranged along the working direction (A) in close proximity to the tool tip (13).

4. The positioning aid of claim 1, wherein at least one of an at least one distance measuring sensor (5) and a deflecting means (12, 12") is axially mounted and moveably spring-loaded.

5. The positioning aid of claim 1, wherein at least one of an at least one distance measuring sensor (5) and a deflecting means (12, 12") is freely rotational with respect to the working direction (A) and exhibits a non-symmetrically distributed weight or can be actively pivoted by a computing unit (7) connected to acceleration sensors.

6. The positioning aid of claim 1, wherein at least one of an at least one distance measuring sensor (5) and a deflecting means (12, 12") is pivotally-lockable at least in one dimension by an angle of 90°.

7. The positioning aid of claim 1, wherein at least one of an at least one distance measuring sensor (5) and a deflecting means (12, 12") is at least, in one dimension, designed to oscillate with a deflecting means (14), in a scanning range (8), with respect to the line of measurement (M, M', M") and the computing unit (7) contains an arithmetic algorithm for determining an end measured value within the oscillation period.

8. The positioning aid of claim 1, wherein at least one of the at least one distance measuring sensor (5) and the deflecting means (12, 12") are one of doubly and triply present and are oriented at an angle of 90° to each other and with respect to the line of measurement (M, M', M").

9. The positioning aid of claim 1, wherein the device has a power source comprising one of a main independent accumulator (11) and an induction coil permeated by the magnetic alternating field of the hand tool device.

10. The positioning aid of claim 1, comprises a single input means (8) by which the actual measured value can be transferred, as the desired value (S), into a storage means.

11. The positioning aid of claim 1, wherein the signaling is controllable by connection to a controlling means (18) of the hand tool device (3).

12. The positioning aid of claim 1, wherein the distance measuring sensor (5) is an optically active sensor with an optically visible laser beam.

13. The positioning aid of claim 1, wherein the tool has a tip and at least one deflecting means (12, 12") is arranged along the working direction (A) in close proximity to the tool tip (13).

14. The positioning aid of claim 1, being combined modularly to the hand tool device (3) and being connectable to a dust extractor (16).

15. The positioning aid of claim 1, wherein at least one of a distance measuring sensor (5) and a deflecting means (12, 12") is actively pivotable with respect to the working direction (A) by a computing unit (7) connected to acceleration sensors.

* * * * *